United States Patent [19]

Quan

[11] Patent Number: 4,561,719

[45] Date of Patent: Dec. 31, 1985

[54] OPTICAL WAVEGUIDE SPLICING APPARATUS AND METHOD

[75] Inventor: Frederic J-Y Quan, Corning, N.Y.

[73] Assignee: Corning Glass Works, Corning, N.Y.

[21] Appl. No.: 353,076

[22] Filed: Mar. 1, 1982

[51] Int. Cl.⁴ .............................................. G02B 5/14
[52] U.S. Cl. .................................................. 350/96.21
[58] Field of Search ............... 350/96.20, 96.21, 96.15

[56] References Cited

U.S. PATENT DOCUMENTS

| | | | |
|---|---|---|---|
| 4,125,768 | 11/1978 | Jackson et al. | 350/96.15 |
| 4,188,087 | 2/1980 | D'Auria et al. | 350/96.15 |
| 4,394,061 | 7/1983 | Schroeder | 350/96.20 |
| 4,452,506 | 6/1984 | Reeve et al. | 350/96.15 |
| 4,474,423 | 10/1984 | Bisbee et al. | 350/96.15 |

OTHER PUBLICATIONS

European Patent Application 0 063 954, (Campbell), based on U.S. Application 258,079 filed 4/27/81 and abandoned on 10/15/82.
Campbell et al.; European Patent Application 82302158.9, Priority date—Apr. 27, 1981, (U.S. Application 258,079).

Primary Examiner—William L. Sikes
Assistant Examiner—Robert E. Wise
Attorney, Agent, or Firm—K. van der Sterre

[57] ABSTRACT

Apparatus and a method for splicing optical waveguide fibers to achieve a splice with minimum attenuation wherein light providing an alignment signal is inserted through the cladding and into the core of a first end section, transmitted into the core of the second end section, and extracted from and monitored at the second end section, with splicing being accomplished after the ends have been moved to a position providing an intensity maximum in the extracted signal.

1 Claim, 7 Drawing Figures

OPTICAL WAVEGUIDE SPLICING APPARATUS AND METHOD

BACKGROUND OF THE INVENTION

This invention relates to apparatus for forming permanent splices in optical waveguide fiber, more particularly to apparatus for forming such splices under field conditions where access to the distant ends of the fiber to be spliced is difficult.

A variety of mechanical bonding and glass fusion methods for splicing optical waveguide fibers, and apparatus for carrying out such methods, have been developed. One suitable technique involves an arc-fusion procedure wherein an electric arc is struck across adjacent ends of fibers to be spliced, to melt and permanently fuse the adjacent end sections. U.S. Pat. No. 3,960,531 to Kohanzadeh et al. discloses apparatus suitable for practicing this method.

Exact alignment of the cores of the fibers to be fused is important if a low-loss splice is to be obtained. Field splicing apparatus is available wherein alignment of the fiber end faces can be checked by microscope examination of the joint, but this does not insure optimum core alignment for minimum splicing loss in case the fiber core is not centered in the waveguide. In addition, only one alignment plane at a time can be checked.

Variable-position connectors have been designed which are adjustable to maximize light transmission through the connection. U.S. Pat. No. 3,800,388 shows a connector for use in an optical transmission line wherein the relative positions of the fiber ends can be changed and the optimum relative position of the fiber ends established by monitoring the intensity of light transmitted through the link. However, this does not provide a permanent joint and disadvantageously requires access to at least one end of the link to introduce the test signal for alignment.

For the above reasons a need exists for optical waveguide splicing apparatus in the form of a portable instrument which permits field splicing with optical monitoring to insure optimum core alignment and without any need for peripheral supporting equipment or access to far ends of a cable or waveguide fiber being spliced.

It is therefore one object of the present invention to provide apparatus for splicing optical waveguide fibers, which is portable and self-contained but with optical fiber alignment capability.

It is a further object of the invention to provide a splicing method utilizing optical alignment but not requiring access to fiber or cable sections other than the end portions of the sections to be spliced.

Other objects and advantages of the invention will become apparent from the following description thereof.

SUMMARY OF THE INVENTION

In accordance with the method of the invention the end portions of two optical waveguide fibers to be spliced, hereinafter termed the first and second sections, and with each section including a glass core and a surrounding cladding layer, are preliminarily aligned such that the axes thereof are substantially parallel and the end face of the first section is in close proximity to that of the second section. After this initial alignment, light is injected through the cladding and into the core of the first section using a suitable light injection means. The light injector is positioned at a point proximate to the fiber end face so that at least a portion of the injected light is propagated through the core of the first section, toward and out of the end face thereof, and into the core of the second section.

Within the second section, and from a point proximate to the end face thereof, at least a portion of the propagating light is extracted through the fiber cladding using suitable optical power tapping means. The relative intensity of this extracted light is sensed using a suitable photodetector, the intensity providing feedback information with respect to fiber alignment and being variable in response to movement of either fiber end face with respect to the other.

The relative position of the fiber end faces is changed by moving at least one of the fiber end portions with respect to the other until a maximum in the intensity of the extracted light is sensed. The end faces of the fiber sections are then fused or adhesively bonded together to provide a permanent fiber splice exhibiting the minimum possible optical loss.

Apparatus suitable for practicing the above-described method comprises first and second fiber retaining means for retaining end portions of the first and second optical waveguide sections, respectively, so that the fiber axes are substantially parallel and the end faces thereof are in close proximity. At least one of these retaining means is adapted to be movable with respect to the other so that the end face of the waveguide fiber therein can be moved relative to the end face of the other section for alignment of the fiber cores.

Positioned adjacent the first fiber retaining means are light injection means adapted to inject light through the cladding and into the core of the end portion of the first optical waveguide section held by the first retainer. Light thus injected propagates down the core and is emitted from the end face of the first fiber section, then entering and propagating down the core of the second fiber section.

Positioned adjacent the second fiber retaining means are optical power tapping means for extracting at least a portion of the light propagating down the core of the second section through the fiber cladding. A photodetector is positioned adjacent this tap so that it intercepts some of the extracted light and can sense intensity changes therein in response to relative movement between the two fiber end faces.

Finally, the apparatus includes splicing means positioned adjacent the end faces of the fiber end portions as positioned by the retainers, the splicer being of a type which will form a permanent junction between the sections after alignment of the end faces has produced a maximum in the amount of light transmitted across the junction and detected. The permanent junction can be formed by adhesive bonding or, preferably, by fusing the fiber end faces together to form a glass-bonded joint.

BRIEF DESCRIPTION OF THE DRAWINGS

The invention may be further understood by reference to the drawing wherein.

DETAILED DESCRIPTION

Figure 1:
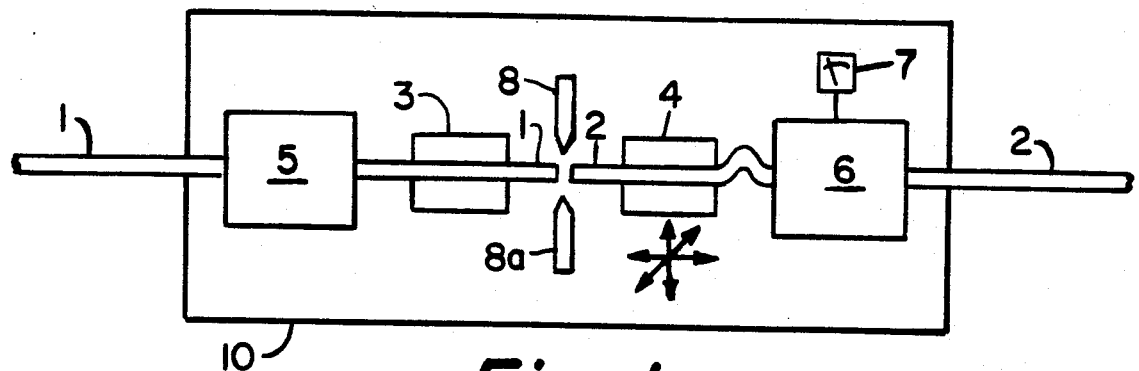
FIG. 1 is a schematic plan view of apparatus provided in accordance with the invention.

Referring to FIG. 1 of the drawing, apparatus 10 for splicing optical waveguide sections 1 and 2 includes first and second fiber retaining means 3 and 4, respectively, which hold the end portions of the fiber sections so that their end faces are in proximity. In the illustrative apparatus shown, retainer 4 may be micromanipulated in three dimensions, as indicated by the adjacent arrows, to move the end face of section 2 with respect to the other end face.

Adjacent to retainer 3 are light injection means 5 through which fiber section 1 is passed before attachment to the retainer. Within injection means 5 are a light source and a coupler to couple light from the source into the fiber as hereinafter more fully described.

Fiber section 2 passes through light monitoring enclosure 6 prior to engagement by moveable retainer 4. Light monitoring enclosure 6 is adapted to prevent the ingress of light and includes both optical power tapping means and photodetector means as hereinafter more fully described. The output of the photodetector is fed to meter 7 which indicates the relative amount of light extracted from fiber section 2.

Apparatus 10 also comprises fiber splicing means which, in the embodiment shown, are arc electrodes 8 and 8a. These electrodes are conventionally connected to a high voltage power supply, not shown, and an electric arc can be struck across electrodes 8 and 8a as desired, thereby fusing the end faces of fiber sections 1 and 2 together for a permanent splice.

Figure 2:
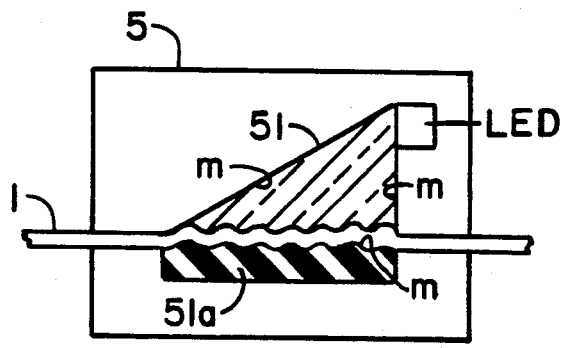
FIGS. 2-2a schematically illustrate light injection means suitable for use in accordance with the invention.
Figure 2A:
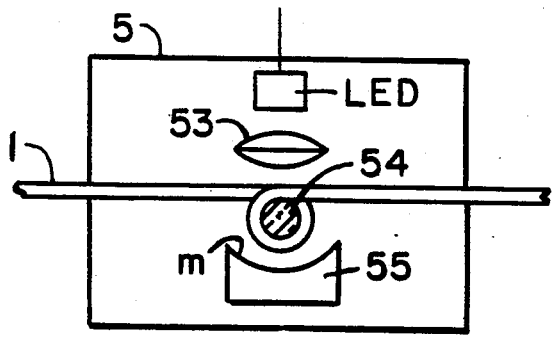

Examples of suitable arrangements for light injection means 5 are schematically shown in FIGS. 2 and 2a of the drawing. Both means utilize fiber bending to inject light into the fiber core. The fiber is bent to a radius such that light traversing the cladding and entering the fiber core at the point of bending will be trapped in the core and propagated down the fiber.

In FIG. 2 the injector comprises a light coupler 51-51a through which the fiber is passed and which creates multiple short-radius bends in the fiber by virtue of its opposing corrugated surfaces which are in direct contact with the fiber cladding. Coupler portion 51 is made up of a transparent material such as glass and includes mirrored surfaces M. A light-emitting diode (LED) attached to an unmirrored point on portion 51 of the coupler serves as the source of the light, which can either enter the fiber directly or be reflected into the fiber by the reflective surfaces M. Coupler portion 51a may be rigid or composed of an elastomeric material which can deform to match the corrugated surface of portion 51, and may optionally also be provided with a mirrored upper surface M.

In FIG. 2a the injection means comprises an LED light source and a lens 53, the lens collimating light from the source and directing it toward reflector 55. Fiber section 1 is looped to form several turns around transparent rod 54 which is at the focus of reflector 55. Thus some light reflected from 55 enters the fiber and is propagated along the core toward the end face of the first section. Enclosures 5 are not essential in FIGS. 2-2a since ambient light does not interfere with the injection of light from the sources.

Figures 4, 5:
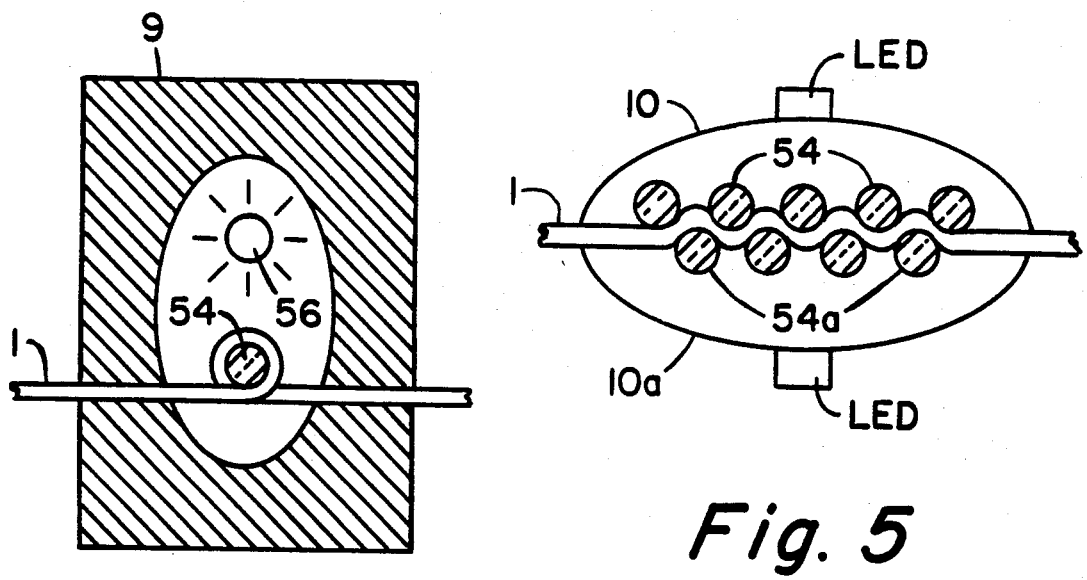

Alternative devices for injecting light into the fiber are shown in FIGS. 4 and 5 of the drawing. In FIG. 4 the injection means includes an enclosure 9 consisting of a hollow metallized plastic or metal block, e.g., of aluminum, forming an elliptical cavity. Fiber section 1 is looped to make several turns around a low refractive index transparent rod 54 which is positioned at one focus of the elliptical cavity, and a point light source 56, e.g., an incandescent lamp, is positioned at the other focus. Thus light from source 56 is concentrated by reflection from the elliptical walls of the cavity onto the fiber section encircling rod 54, and is thereby injected into the fiber.

In FIG. 5 the injection means comprises two separate opposing reflectors 10 and 10a, fabricated, for example, of sheet metal, which can be clamped together to form a cavity as shown. As these reflectors are clamped together over a portion of fiber section 1, the fiber section is clamped between small transparent opposed interleaving rod members 54 and 54a having a lower refractive index than the fiber, those members being joined, respectively, to reflectors 10 and 10a. These interleaving rod members create multiple, short-radius bends in fiber section 1, such that light from the opposing LED light sources, positioned at openings in the reflectors, is readily injected into the fiber.

Figure 3:
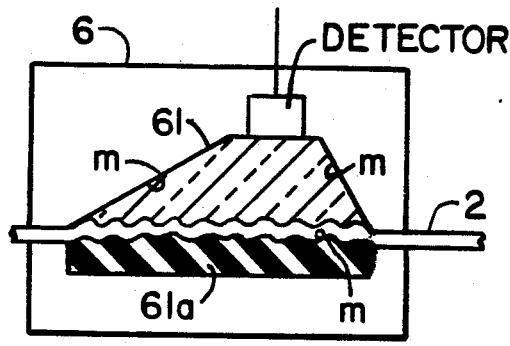
FIGS. 3-3a schematically illustrate optical power tapping and sensing means provided in accordance with the invention, and FIGS. 4 and 5 schematically illustrate alternative light injection means suitable for use in the invention.
Figure 3A:
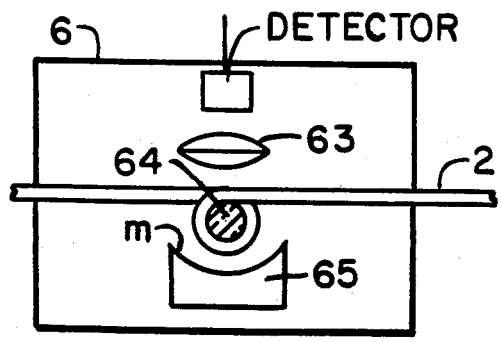

Examples of suitable arrangements for optical power taps and combinations thereof with photodetectors are schematically illustrated in FIGS. 3 and 3a of the drawing. In FIG. 3, light-tight enclosure 6 contains optical power tapping assembly 61-61a to which a light detector is attached. The tap includes member 61 which is made of a transparent material such as glass and has a corrugated surface for contacting the cladding of fiber section 2. Member 61a of the tap, which may be made of rigid or elastomeric material and has a reflective surface M, presses the fiber into conformity with member 61.

Light exiting fiber section 2 through the cladding thereof is transmitted directly or by reflection from the reflective surface of member 61a toward the light detector attached to member 61. If desired, the opposing surfaces M of member 61 may be reflectively coated to prevent the escape of light without detection. The detector may be connected to a meter which responds to the intensity of light striking the detector, as shown in FIG. 1.

In the combination power tap and detector of FIG. 3a, fiber section 2 is wrapped several times around transparent rod 64 permitting light to escape the fiber core through the cladding. Some of the escaping light is reflected by reflector 65 and is focused by lens 63 onto the detector.

In either of the power tap-detector combinations above described the detector can be a PIN diode, an avalanche photo-diode, a cadmium sulfide cell, a photo multiplier tube or other device, depending on the light wavelength to be sensed. If desired, the detector may be separate from the power tap but connected thereto by a conventional light guide.

In light injecting means such as shown in FIGS. 2-2a the LED light source can be replaced by other known light sources, for example incandescent or laser diode sources or the like, depending upon the configuration of the coupler used to couple light into the fiber core. Alternative coupling devices may also be substituted, both for light injection and light extraction, provided they are operative without breaking or damaging the fiber.

An enclosure for waveguide splicing apparatus provided according to the invention can contain additional equipment useful for fiber alignment and/or splicing, including a battery power supply for applying voltage to the light source of the apparatus. This battery might also supply high voltage to the fusion arc if a high efficiency inverter can be employed. Of course, provision may be made for connecting the apparatus to an external power source if desired. Similarly, a mechanism for applying an adhesive bonding substance between the fiber end faces may be substituted for the arc fusion system as the splicing means for the apparatus, although fusion splicing is clearly preferred.

A particularly advantageous feature of apparatus provided in accordance with the invention is that microscope-type optical systems for visually aligning the fiber ends to be spliced are not required. Once the relative position of the fiber retainers has been approximately fixed, micro-manipulation thereof with reference to the detector output is sufficient to insure optimized low-loss splicing on a rapid and repeatable basis.

I claim:

1. In apparatus for splicing first and second sections of optical waveguide fiber having a core and a cladding, which apparatus includes optical fiber splicing means, first and second fiber retaining means for retaining first and second end portions of the sections in close proximity for splicing, at least one of said retaining means being movable such that the fiber end portions can be relatively aligned, light injection means positioned in proximity to the first fiber retaining means for injecting light through the cladding and into the core of a fiber section retained in said means, and optical power tapping means positioned in proximity to the second fiber retaining means for extracting through the cladding light propagating in the core of a fiber section retained in said means, the improvement characterized in that:

at least one of the light injection means and optical power tapping means comprises the following structure:
(a) opposing first and second fiber contact elements cooperating to constrain an optical fiber section enclosed therebetween to follow a corrugated path;
(b) said first fiber contact element being formed of a transparent material and comprising a rigid corrugated fiber contact surface;
(c) said second fiber contact element having a fiber contact surface formed of a resilient material adapted to conform to said rigid corrugated surface when in contact therewith;
(d) said resilient fiber contact surface being mirrored; and
(e) said rigid corrugated fiber contact surface being transparent to light injected into or extracted from the fiber through the fiber cladding.

* * * * *